United States Patent
Sandman, Jr. et al.

(10) Patent No.: US 8,812,975 B2
(45) Date of Patent: Aug. 19, 2014

(54) MANAGING WINDOWS THROUGH POLICIES

(75) Inventors: James G. Sandman, Jr., Los Altos Hills, CA (US); Eric Berdahl, Morgan Hill, CA (US); Scott Kovatch, Pleasanton, CA (US)

(73) Assignee: Adobe Systems Incorporated, San Jose, CA (US)

( * ) Notice: Subject to any disclaimer, the term of this patent is extended or adjusted under 35 U.S.C. 154(b) by 906 days.

(21) Appl. No.: 12/570,627

(22) Filed: Sep. 30, 2009

(65) Prior Publication Data
US 2013/0042201 A1 Feb. 14, 2013

(51) Int. Cl.
*G06F 3/048* (2013.01)
*G06F 3/00* (2006.01)
*G06F 9/54* (2006.01)
*G06F 3/0481* (2013.01)
*G06F 9/44* (2006.01)

(52) U.S. Cl.
CPC .............. *G06F 9/542* (2013.01); *G06F 9/443* (2013.01); *G06F 9/541* (2013.01); *G06F 3/0481* (2013.01)
USPC ............ 715/781; 715/797; 719/328; 719/329

(58) Field of Classification Search
CPC ......... G06F 9/541; G06F 9/4443; G09G 5/14; H04L 47/10
USPC .......................................... 715/781, 804, 808
See application file for complete search history.

(56) References Cited

U.S. PATENT DOCUMENTS

| | | | | |
|---|---|---|---|---|
| 5,734,380 | A * | 3/1998 | Adams et al. ................. | 715/804 |
| 5,922,044 | A * | 7/1999 | Banthia ......................... | 709/203 |
| 6,658,419 | B2 * | 12/2003 | Pasquali ........................ | 715/781 |
| 6,864,905 | B2 * | 3/2005 | Meaden ......................... | 715/806 |
| 7,213,213 | B2 * | 5/2007 | Sekiguchi ...................... | 715/781 |
| 7,325,204 | B2 * | 1/2008 | Rogers .......................... | 715/792 |
| 8,191,086 | B2 * | 5/2012 | Sandland et al. .............. | 719/328 |
| 8,234,640 | B1 * | 7/2012 | Fitzgerald et al. ................ | 718/1 |
| 8,321,932 | B2 * | 11/2012 | Bhargava et al. ............... | 726/21 |
| 2003/0033443 | A1 * | 2/2003 | Igotti ............................ | 709/328 |
| 2006/0005187 | A1 * | 1/2006 | Neil ................................. | 718/1 |
| 2006/0230105 | A1 * | 10/2006 | Shappir et al. ................ | 709/203 |
| 2008/0295022 | A1 * | 11/2008 | Valdes et al. .................. | 715/781 |
| 2010/0274910 | A1 * | 10/2010 | Ghanaie-Sichanie et al. ............................. | 709/229 |

OTHER PUBLICATIONS

Adobe Introduction to Scripting, Adobe Systems Incorporated, Table of Contents and Introduction, 2007, 5 pages.

(Continued)

*Primary Examiner* — Tadeese Hailu
(74) *Attorney, Agent, or Firm* — Wolfe-SBMC (57) ABSTRACT

Methods, systems, and apparatus, including computer program products feature receiving, from a client application running in a virtual machine and displayed within a first window of a graphic display, a request to create a second window within the graphic display. In an example implementation, a first set of one or more parameters is received in association with the request. The request and some or all of the first set of one or more parameters are provided to a host application. An indication of a determination is received from the host application as to whether the second window has been created. The determination is based on a policy of the host application. The indication of the determination is provided to the client application. If the indication of the determination indicates that the second window has been created, the indication further includes an identifier associated with the second window.

20 Claims, 4 Drawing Sheets

(56) References Cited

OTHER PUBLICATIONS

Kirschner "Using (Native) Windows with AIR", dated Mar. 18, 2008, downloaded from the internet at http://pegolon.wordpress.com/2008/03/18/using-nativewindows-with-air/ on Aug. 12, 2011, 7 pages.

Wikipedia, "ActionScript", dated Mar. 26, 2010, downloaded from the internet at http://web.archive.org/web/20100326032416/http://en.wikipedia.org/wiki/ActionScript on Aug. 12, 2011, 8 pages.

Wikipedia, "Flash Player", dated May 26, 2008, downloaded from the internet at http://web.archive.org/web/20080528054248/http://en.wikipedia.org/wiki/Flash_Player on Aug. 12, 2011, 4 pages.

Wikipedia—SpiderMonkey (JavaScript engine) [online], (retrieved on Aug. 26, 2009). Retrieved from the Internet: <URL: http://en.wikipedia.org/w/index.php?title=SpiderMonkey_(JavaScript_engine)&printable=yes>, 2 pages.

Wikipedia, "Web Browser", dated May 21, 2008, downloaded from the internet at http://web.archive.org/web/20080528040344/http://en.wikipedia.org/wiki/Web_browser on Aug. 12, 2011, 3 pages.

* cited by examiner

MANAGING WINDOWS THROUGH POLICIES

TECHNICAL FIELD

This document relates to managing windows in a graphic display through use of policies.

BACKGROUND

Host applications being executed by computing devices can provide a mechanism for client applications to execute code and provide content to users. Host applications can provide virtual machines for executing client applications. Virtual machines can provide scripting interactivity at runtime, and support for video, audio, and graphics. Host applications can provide windows within visual displays, such as computer monitors. A host application can allow a client application to display content, such as video, graphics, and text, to users. The client application is also provided with an event stream for receiving input from a user in the form of keyboard key strokes, mouse clicks and movements, touch screen or touch pad input, or other input.

SUMMARY

In general, in one aspect, embodiments feature receiving, from a client application running in a virtual machine and displayed within a first window of a first graphic display, a request to create a second window within the first graphic display or a second graphic display. A first set of one or more parameters is received in association with the request. The request and some or all of the first set of one or more parameters are provided to a host application. An indication of a determination is received from the host application as to whether the second window has been created. The determination is based on a policy of the host application. The indication of the determination is provided to the client application. If the indication of the determination indicates that the second window has been created, the indication further includes an identifier associated with the second window. The policy determines how the second window is displayed in relation to the first window.

These and other embodiments can optionally include one or more of the following features. The second window can be created as a second window portion within the first window. The second window can be created as a stand alone window separate from the first window. The first set of one or more parameters can include height and width parameters for the second window. The first set of one or more parameters can include parameters associated with a visual aspect of a border of the second window. The first set of one or more parameters can include an indication of a control associated with the second window. The first set of one or more parameters can include a location parameter for the second window. The first set of one or more parameters can include the identifier associated with the second window. If the indication of the determination indicates that a second window has been created, the indication can further include a second set of one or more parameters associated with the second window in addition to the identifier. The second set of one or more parameters can include height and width parameters for the second window that are different than height and width parameters included in the first set of one or more parameters. The one or more parameters in the first set of one or more parameters can be received as attributes associated with a class. At least one of the parameters of the first set of one or more parameters can be received as a first value of a variable associated with a class. At least one of the parameters of the second set of one or more parameters can be received as a second value of the variable associated with the class. The second value can be different from the first value. A request to change an aspect of the second window can be received from the client application. The request can include a third set of one or more parameters. The request to change an aspect of the second window and some or all of the third set of one or more parameters can be provided to the host application. An indication of a second determination can be received from the host application as to whether the aspect of the second window has been changed. The second determination can be based on the policy of the host application. The indication of the second determination can be provided to the client application. The request to change an aspect of the second window can be a request to change the size of the second window.

In general, in another aspect, embodiments feature a client application running in a virtual machine and displayed within a first window of a first graphic display. The client application is configured to generate a request to create a second window within the first graphic display or a second graphic display and a set of requested attributes for the second window. A communication layer is configured to provide an application programming interface (API) to facilitate the request. A host application is configured to receive the request, grant or deny the request based on a policy of the host application, and generate a set of granted attributes for the second window in association with a granted request to create the second window.

These and other embodiments can optionally include one or more of the following features. The API can include a set of variables. The requested attributes and granted attributes can be indicated by values assigned to the variables. The client application can be further configured to indicate a first attribute from the set of requested attributes by assigning a first value to a first variable of the set of variables. The host application can be further configured to indicate a second attribute from the set of granted attributes by assigning a second value to the first variable. the second value is different from the first value. The second value can be different from the first value. The host application can be further configured to grant one or more of the requested attributes based on the policy of the host application. At least one of the granted attributes can be different from any of the requested attributes. The set of requested attributes can include an indication of a requested size for the second window.

In general, in another aspect, embodiments feature a computer program product tangibly embodied in a computer-readable medium and comprising instructions that when executed by a processor perform a method. The method includes providing a request to create a new window within a graphic display and a first set of one or more parameters associated with the request to a host application. An indication of a determination is received from the host application as to whether the new window has been created, where the determination is based on a policy of the host application. If the indication of the determination indicates that the second window has been created, the indication further includes a second set of one or more parameters associated with the second window.

These and other embodiments can optionally include one or more of the following features. The new window can be created as a new window portion in a previously displayed window. The first set of one or more parameters can include height and width parameters for the new window. The second set of one or more parameters can include height and width parameters for the new window that are different than the height and width parameters included in the first set of one or more parameters. The one or more parameters in the first set of one or more parameters can be provided as attributes associated with a class.

Implementations can provide any, all or none of the following advantages. A host application allows client applications running within windows provided by the host application to request new windows for displaying content. An intermediate application allows client applications to specify parameters associated with a request for a new window. The intermediate application allows client applications to request changes to parameters or attributes associated with a window. The host application can approve or deny requests for new windows or requests to modify window attributes. The host application can retain control over the appearance and security of a user interface of a client application. The intermediate application allows client applications to interact with a variety of host applications in a uniform manner when requesting new windows and requesting changes to window attributes.

The details of one or more implementations are set forth in the accompanying drawings and the description below. Other features and advantages will be apparent from the description and drawings, and from the claims.

DETAILED DESCRIPTION

Figure 1:
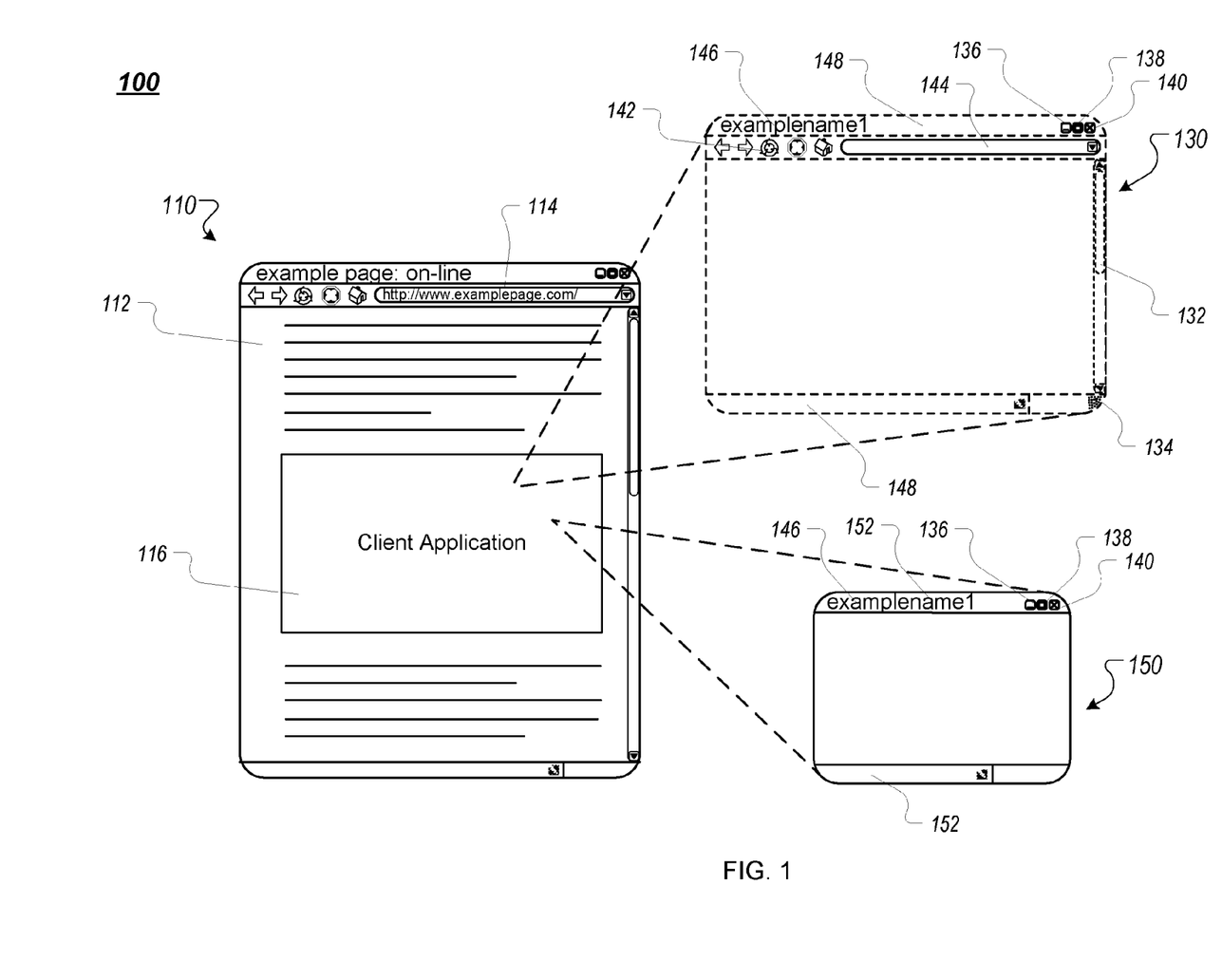
FIG. 1 shows example application windows displayed on a visual display.

Referring to FIG. 1, in accordance with some implementations, a graphic display 100 includes a window 110. The window 110 is an application window associated with a host application. For example, the window 110 can be a browser window of a web browser application. The window 110 displays a page 112. For example, if the window is a browser window, the page displayed by the window 110 can be a web page. A user can specify a page to be displayed in the window 110 by typing a Uniform Resource Locator (URL) or file extension into an address bar 114 of the window 110. For example, entering "www.examplepage.com" into the address bar 114 causes the page 112 to be displayed in the window 110.

The page 112 includes content that is displayed in the window 110. The content includes a client application 116. In some implementations, the client application 116 is embedded in the page 112. In some implementations, the client application 116 is executed by a virtual machine, such as Adobe Flash, Java Runtime Environment, or Siemens PLM, that is configured to execute with the host application process. The virtual machine executes one or more files associated with the client application 116. In some implementations, the client application 116 presents animation, video, or audio within the window 110. In some implementations, an event stream is provided to the client application 116. In some implementations, the event stream is provided by the host application. In some implementations, an intermediate application, or communication layer, receives the event stream from an operating system and provides the event stream to client applications. In some implementations, the host application provides the event stream to an intermediate application or communication layer which in turn provides the event stream to client applications. The event stream allows the client application 116 to receive input from a user in the form of keyboard key strokes, mouse clicks and movements, touch screen or touch pad input, or other input. For example, the client application 116 may display a movie in the form of streaming video. In this example, the client application 116 displays controls along with the video (e.g. pause, play, fast forward, volume adjustment, etc.). The event stream allows the client application 116 to receive input from a user (e.g. mouse clicks and movements) in order to allow the user to use the controls displayed by the client application 116. As another example, the client application 116 includes one or more text fields. The event stream allows the client application 116 to receive key strokes from a user for populating the text fields. As yet another example, the event stream allows the client application 116 to receive mouse clicks and movements input by a user in order to allow the user to select or highlight items or icons displayed by the client application 116.

In some implementations, the client application 116 requires an additional window within the graphic display 100 for displaying additional content. For example, the client application 116 displays an interactive game in which a user moves a character through various areas. In this example, the client application 116 displays an icon that a user can select in order to cause a map of the various areas depicted in the game to be displayed. In some implementations, selecting the icon causes a map to be displayed within the portion of the window 110 already occupied by the client application 116. In such instances, displaying the map within the portion of the window 110 already occupied by the client application 116 causes other content displayed by the client application 116 to be displaced or obscured by the map.

In some implementations, the client application 116 requests an additional window for displaying the additional content so that other content displayed by the client application 116 is not displaced or obscured from view. In some implementations, a communication layer provides a mechanism for the client application 116 to request a new window from the host application. In some implementations, the communication layer is an application programming interface (API) application that implements a communication protocol between the host application and one or more client applications. In some implementations, the communication layer is a data structure used to pass signals and data between the host application and one or more client applications. The communication layer can define how the client application 116 requests a new window and what information is to be included with a request for a new window. In some implementations, the communication layer defines a class or data structure. The class or data structure is associated with one or more predefined attributes. In some implementations, the communication layer allows the client application to specify values for one, some, or all of the attributes. In other implementations, the values of specified attributes can not be set by the client application. In such implementations, the specified attributes are used to supply information to the client application 116, the communication layer, or the host application. In some such implementations, the values of the specified attributes are set by the communication layer or the host application.

In some implementations, a client application is not displayed within a first window before the client application creates a request for a new window. For example, the client application 116 may be a background application that does not initially include a visual component. In this example, the client application 116 is not initially displayed within the window 110. During execution, the client application 116 generates a request for a new window in order to display visual components of the client application 116.

When requesting a new window, the client application 116 can specify one or more parameters in association with the request for a new window. In some implementations, the client application 116 specifies parameters by setting values for attributes associated with a class defined by the communication layer. For example, when requesting a new window, the client application specifies desired dimensions and a desired location within the graphic display 100 for the new window. In some implementations, the desired location is specified as a specific pixel location of the graphic display 100. For example, the client application 116 indicates a specific pixel where the upper left corner of the new window is to be located. In other implementations, the client application 116 specifies a quadrant or corner of the graphic display 100 in which to create the new window. For example, the client application 116 indicates that the new window is to be created in the lower right corner of the graphic display 100. In still other implementations, the client application 116 does not specify a desired location for the new window. In such implementations, the location of the new window may be determined by the host application or the communication layer.

In some implementations, the client application 116 specifies desired dimensions for the new window by indicating height and width values for the new window. For example, the client application 116 sets values for specified height and width attributes of a new window class defined by the communication layer. The height and width values for the new window can be specified using various forms of measurement, including number of pixels, millimeters, inches, or other units of length measurement. In some implementations, the dimensions of the new window are specified using a coordinate system. In some implementations, the client application 116 specifies a desired area for the new window without specifying specific height and width values.

Other parameters that can be specified by the client application 116 when requesting a new window can include visual aspects that affect the appearance of the new window. For example, the communication layer allows the client application 116 to specify a specific color, design, pattern, or theme for the border of the new window. In some implementations, the border is alternatively referred to as a frame, trim, chrome, or fringe. As an example, the client application 116 requests a red border for the new window. As another example, the client application 116 indicates that the new window should have a green and gold striped border. As yet another example, the client application 116 indicates that the border of the new window is to be semi-transparent to allow partial visibility of other windows and items located behind the border of the new window within the graphic display 100. In some such instances, the client application 116 may indicate a specific degree of transparency. As another example, the client application 116 indicates one or more images to be used as the border for the new window. In some implementations, the one or more images are selected from a discrete library of images indicated by the communication layer or the host application. In other implementations, the client application 116 provides the one or more images, or provides a pointer to a location of the one or more images to be used as the border. In some implementations, the communication layer allows the client application 116 to select a pattern for the new window from a specified set of patterns. For example, the specified patterns can include horizontal stripes, vertical stripes, diagonal stripes, polka dots, checkered, plaid, etc.

Specifying visual attributes of the border of the new window allows the client application 116 to indicate to a user that the new window is associated with the client application 116. For example, the client application 116 may request several windows during execution. By specifying a similar visual aesthetic for the borders of each of the windows, the client application 116 can readily indicate to a user that each of the new windows is part of the same application. This allows a user to easily identify windows associated with the client application 116 and differentiate the windows associated with the client application 116 from other windows present on the graphic display 100. For example, when a new window is created for the client application 116, the user can readily identify the new window as being associated with the client application 116 based on visual aspects of the border of the new window. This indicates to the user that the new window most likely includes content that the user wishes to view. This helps the user to easily differentiate windows associated with the client application 116 from other non-desired windows that appear during execution of the client application 116. For example, a pop-up window that is not associated with the client application 116, but rather, includes an advertisement (aka, a pop-up ad) is displayed on the graphic display 100. Since the pop-up window is not associated with the client application 116, the appearance of the border of the pop-up window is not specified by the client application 116. If the border of the pop-up window has a different appearance from the borders of windows associated with the client application 116, the user can easily identify the pop-up window as a pop-up ad and not a new window associated with the client application 116. The user can then choose to close the pop-up window.

Still referring to FIG. 1, in accordance with some implementations, in addition to specifying an appearance for the border of a requested new window, the client application 116 indicates dimensions or locations for the border. For example, the client application 116 specifies that the new window should only have a top and bottom border, but no side borders. As another example, the client application 116 indicates that the new window is to have top and side borders but no bottom border. As yet another example, the client application 116 indicates a desired width for the top border of 10 pixels and a desired width of the side and bottom borders of 5 pixels.

In some implementations, the communication layer allows the client application 116 to indicate an identifier for a requested new window. The identifier can be a character string used to identify the new window. In some implementations, the identifier is displayed as part of the new window. For example, the identifier is displayed in an upper border of the new window. Specifying an identifier for the new window allows the client application 116 to indicate the intended purpose or use of the new window. For example, the client application 116 can be an interactive drawing application that allows a user to create images. In this example, client application 116 requests a new window in order to display a color palette of colors that can be used for creating images. The client application 116 indicates an identifier of "color palette." In this example, when the new window is created, the identifier of "color palette" is displayed in the upper left corner of the new window. This helps a user to readily identify the new window as a color palette for use with the interactive drawing application. In some cases, the identifier can indicate that the new window is associated with the client application 116. For example, if the client application 116 is an application called "picture maker," the client application 116 can include the string "picture maker" in a specified identifier associated with a requested new window. If the identifier which includes the string "picture maker" is displayed as part of the new window, a user can easily identify the new window as being associated with the client application 116.

In some implementations, the communication layer allows the client application 116 to request that a requested new window be made maximizable or minimizable. In some implementations, a request to make a new window maximizable or minimizable includes a request for maximize and minimize controls to be included with the new window. In some implementations, the communication layer allows the client application 116 to request that a requested new window be made resizable. For example, the client application 116 can request that a new window include one or more gripper areas to allow a user to resize the new window. In such instances, the user can resize the new window by selecting one of the gripper areas with a cursor and dragging the cursor in order to change the dimensions of the new window. In other instances, the user can change the size of the new window by specifying height and width dimensions for the new window. In some implementations, the new window can not be resized by the user, but can be resized in response to resizing requests from the client application 116.

In some implementations, parameters associated with a request for a new window include an indication that the new window is to be semi-transparent to allow partial visibility of other windows and items located behind the new window within the graphic display 100. In some such implementations, the client application 116 may indicate a specific degree of transparency. In some implementations, the client application 116 can request that a requested new window include one or more scroll bars for scrolling through content displayed in the new window. In some such implementations, the client application 116 specifies the location of a scroll bar within the new window or an appearance for the scroll bar.

In some implementations, the communication layer allows the client application 116 to specify controls to be included in a requested new window. Controls can include minimize and maximize controls, resizing controls, printing controls, text sizing and font controls, and file opening and saving controls. In some implementations in which the host application is a web browser, the client application 116 may indicate that web navigation controls (e.g. forward, back, refresh, etc.) are to be included with the new window. In some implementations, the communication layer allows the client application 116 to specify a window type for a requested new window. For example, the client application 116 indicates that the new window should be a stand alone window, separate from the window 110. As another example, the client application 116 is to be a full screen window (i.e. the new window should occupy the entire graphic display 100). As another example, the client application 116 can indicate that the new window is to be created as a segment or portion of the window 110. In this example, the host application separates the window 110 into two window portions. The host application displays the page 112 in the first window portion and allows the client application 116 to use the second window portion as the new window.

Still referring to FIG. 1, in the example depicted, the client application 116 sends a request to the communication layer for a requested new window 130. The client application 116 specifies several parameters when requesting the requested new window 130. Requested parameters associated with the requested new window 130 include, a scroll bar 132 located on the right side of the requested new window 130, a gripper area 134 in the lower right corner of the requested new window 130 for allowing a user to resize the requested new window 130, and a minimize control 136, a maximize control 138, and a close window control 140 located in the upper right corner of the requested new window 130. Continuing with the example shown in FIG. 1, additional requested parameters associated with the requested new window 130 include browser navigation controls 142, an address bar 144, and an identifier 146 of "examplename1." Additionally, following this example, the client application 116 indicates desired height and width dimensions and a desired location for the requested new window 130. The client application 116 can also specify a color scheme, or other visual attributes for a border 148 of the requested new window 130 as described above.

In some implementations, the communication layer defines a class and attributes associated with the class. The client application 116 requests the requested new window 130 by calling the class defined by the communication layer. The client application 116 specifies the parameters for the requested new window 130 by setting values for the attributes. Upon receiving the request for the requested new window 130 from the client application 116, the communication layer provides the request and some or all of the parameters associated with the request to the host application. In some implementations, the communication layer may include additional parameters not provided by the client application 116 when providing the request to the host application. For example, if the client application 116 requests that the new window be created as a new window portion within the same window that includes the client application 116 (in this case, the window 110), the communication layer can determine that the client application 116 is executing within the window 110 and provide an indication of the window 110 to the host application to indicate to the host application that the new window portion is to be created within the window 110.

Upon receiving a request for a new window and parameters associated with the request from the communication layer, the host application makes a determination as to whether the new window is to be created for the client application 116. This determination is based on a policy associated with the host application. For example, the policy of the host application may specify that new windows are never created in response to requests for new windows received from client applications running in virtual machines. As another example, the policy may indicate that new windows are to be created only for client applications specified in a list of approved client applications. In such instances, the policy of only creating new windows for use by approved client applications can improve stability and security for a system that includes the host and client applications. For example, allowing only approved client applications access to newly created windows can prevent unknown client applications from executing malicious code within the newly created window.

In some implementations, the policy of the host application may indicate that only a certain types of windows can be created. For example, the policy may specify that only new window portions within an already existing window are created in response to requests for new windows. As another example, the client application 116 may request a new window portion within the window 110, but the policy of the host application specifies that new windows can only be created as stand alone windows. In this example, the host application creates a new stand alone window in response to the client application 116's request for a new window portion within the window 110. In some implementations, the policy of the host application may indicate a maximum number of windows that can be associated with a client application. For example, the policy may specify that each client application is allowed to request the creation of three new windows within the graphic display 100. In this example, if a client application has already requested the creation of three new windows, any subsequent requests for new windows made by the client application will be denied. This can prevent a client application from opening a large number of windows and obscuring the view of other windows and items within the graphic display 100.

In some implementations, in addition to specifying conditions for when a window can be created or what type of a window can be created, the policy may also define rules for what parameters are allowed for a new window. Referring again to the example depicted in FIG. 1, the request for the requested new window 130 along with the requested parameters associated with the requested new window 130 as described above are provided to the host application. Upon receiving the request and the requested parameters, the host application compares each requested parameter to the policy associated with the host application to determine which requested parameters will be allowed. In response to the request to create the requested new window 130, rather than creating the requested new window 130, the host application creates the actual new window 150. The actual new window 150 created by the host application can include some, all, or none of the requested parameters specified by the client application 116. Continuing with this example, the actual new window 150 has smaller height and width dimensions than the requested new window 130. This difference in dimensions can be attributed to a policy of the host application. In this example, the policy specifies a maximum size for new windows. If a new window request indicates a requested new window having size dimensions larger than the maximum allowed size dimensions specified by the policy, a new window is created that has the maximum allowed size dimensions. In some implementations, the policy of the host application indicates that client applications are not allowed to specify dimensions for a new window. In such implementations, all new windows may have the same size, or the size of newly created windows may be based on other factors, such as the number windows currently displayed on the graphic display 100, or the identify of the client application from which a new window request originated. Additionally, the actual new window 150 is in a different location than the requested location specified by the client application 116 in association with the request for the requested new window 130. In this example, the policy of the host application does not allow the host application to create a new window based on a location parameter specified by a client application. In some instances, the host application creates new windows in a random location, or in a specific location that is at least partially dependent on the number of other windows displayed within the graphic display 100.

Still referring to FIG. 1, the actual new window 150 does not include a gripper area to allow a user to resize the actual new window 150. This may be based on a policy of the host application that specifies that users are not allowed to resize new windows.

The actual new window 150 additionally does not include a scroll bar, browser navigation controls, or an address bar as requested for the requested new window 130 by the client application 116. The host application determines not to include each of these features in the actual new window 150 based on the policy of the host application. In the example depicted, several of the requested parameters associated with the requested new window 130 have been granted by the host application and are included in the actual new window 150. Each of these granted parameters is in accordance with the policy of the host application. The actual new window 150 includes the requested minimize control 136, maximize control 138, and close window control 140. The actual new window 150 additionally includes the requested identifier 146 of "examplename1" located in the upper left corner of the actual new window 150.

The actual new window 150 further includes a border 152. In some implementations, the border 152 may be the same as the requested border 148 associated with the requested new window 130. In other implementations, the policy of the host application does not allow one or more of the parameters associated with the requested border 148. For example, the client application 116 may request a color for the border 148 that is not allowed by the policy of the host application. As another example, the client application 116 indicates specific images to be used as part of the border 148. In this example, the policy of the host indicates that client application defined images may not be used as part of a border for a new window and therefore the host application does not include the images indicated by the client application 116 in the border 152.

After the host application has made a determination as to whether or not to create a new window in response to a request for a new window, the host application passes an indication of whether or not a new window has been created to the communication layer. The communication layer then provides the indication to the client application 116. In the case where the host application creates a new window in response to a request to create a new window, the host application can provide parameters associated with the new window to the communication layer. For example, upon creating the actual new window 150, the host application can indicate that the actual new window 150 includes the minimize control 136, the maximize control 138, the close window control 140, the border 152, and the identifier 146. The host application can additionally provide parameters associated with visual aspects of the border 152 to the communication layer. In some implementations, the host application will provide an additional indicator, or handle, to the communication layer. The handle is used to identify the actual new window 150. The host application, communication layer, and client application 116 can use the handle to identify the actual new window 150 in further communications involving the actual new window 150. In some implementations, the identifier 146 is also used as the handle for the actual new window 150. In such implementations, a second, separate handle that is distinct from the identifier 146 is not required.

In some implementations in which a class is defined by the communication layer and attributes associated with the class are used to specify requested parameters for the requested new window 130, the host application passes parameters associated with the actual new window 150 to the communication layer by setting values for the attributes associated with the class. For example, the host application can set attributes associated with height and width dimensions to the values of the height and width of the actual new window 150. As another example, the host application can set the value of a handle attribute to the handle of the actual new window 150. As yet another example, the host application can indicate that a scroll bar was not created by setting a scroll bar attribute to NULL. As yet another example, the host application can indicate that the maximize control 138 is included in the actual new window 150 by setting a maximize control attribute to 1.

The communication layer provides the indication that the actual new window 150 has been created by the host window to the client application 116. The intermediate application additionally provides some or all of the parameters associated with the requested new window 130 to the client application 116. Upon receiving the indication of the actual new window 150, the client application 116 can execute within the actual new window 150 in order to present content within the actual new window 150. In some implementations, the host application provides an event stream to the client application 116 to allow the client application 116 to receive user input in association with the requested new window 130. For example, the event stream can allow the client application 116 to receive mouse movements and clicks and keyboard key strokes when the actual new window 150 is an active window.

In some implementations, after the host application has created the actual new window 150 for use by the client application 116, the client application 116 can create additional requests associated with the actual new window 150. One such request may be a request to resize the actual new window 150. For example, the client application 116 is an interactive drawing application and the actual new window 150 is used by the client application 116 to display graphic items that can be placed in a drawing that is being created using the client application 116. A user of the client application 116 may wish to add additional items to the display of graphic items shown in the actual new window 150. In order to display the additional items within the actual new window 150, the client application 116 may need to request that the actual new window 150 be enlarged. The client application 116 can create a request which includes an indication of the actual new window 150 (e.g. the identifier 146 or a different handle associated with the actual new window 150).

The request can indicate that the client application 116 wishes to enlarge the actual new window 150. In some implementations, the client application 116 specifies new height and width dimensions for the actual new window 150. The client application 116 provides the request and associated parameters to the communication layer which in turn provides the request and associated parameters to the host application. The host application then determines whether to grant or deny the request to resize the actual new window 150 based on a policy associated with the host application. For example, if the requested new window size is greater than a maximum window size specified by the policy of the host application, the host application will deny the request to resize the actual new window 150. The host then provides an indication of whether or not that actual new window 150 has been resized to the communication layer which in turn provides the indication to the client application 116. In another example of an additional request, the client application 116 may create a request to change the location of the actual new window 150. The host application can determine whether or not to change the location of the actual new window 150 based on a policy of the host application. As yet another example, the client application 116 may create a request to change visual aspects of the border 148 of the actual new window 150. The host application can approve or deny the request based on a policy of the host application.

In some implementations, when a new window is closed, the communication layer can determine that the new window has been closed and inform the client application 116. For example, a user can close the actual new window 150 by using a cursor to click on the close window control 140. The communication layer can determine that the user has closed the actual new window 150 and inform the client application 116 that the actual new window 150 has been closed. In some implementations, the communication layer can determine when the client application 116 has ceased execution or when the window 110 which displays the graphic output of the client application 116 is closed. In response, the communication layer can inform the host application that the client application 116 client application has ceased execution. The host application can then close any remaining windows associated with the client application 116. In some implementations, the client application 116 sends an indication to the communication layer that the actual new window 150 is no longer needed. The communication layer can then indicate to the host application that the client application 116 no longer needs the actual new window 150. The host application can then close the actual new window 150.

In some implementations, the client application 116 may create a request for a parameter associated with the actual new window 150. For example, the host application may allow the size of the actual new window 150 to be adjusted by a user. The client application 116 can create a request for the current size of the actual new window 150. The client application 116 provides the request to the communication layer which in turn provides the request to the host application. The host application can then indicate the current height and width dimensions of the actual new window 150. As another example, the client application 116 may create a request for the current location within the graphic display 100 of the actual new window 150.

In some implementations, other requests that can be created by the client application 116 and received by the host application include requests to maximize the actual new window 150, requests to minimize the actual new window 150, requests to restore the actual new window 150 to its previous size from a maximized or minimized state, and requests to make the actual new window 150 the active window (the active window can also be referred to as the main window or the window with keyboard focus). For example, the client application 116 may request creation of the actual new window 150 in order to collect information from a user. Upon receipt of an indication that the actual new window 150 has been created, the client application 116 requests that the actual new window 150 is made the active window. If the host application approves the request to make the actual new window 150 the active window, the user can type text into text fields presented by the client application 116 within the actual new window 150. Additional requests that can be created by the client application 116 and received by the host application include requests to bring the actual new window 150 to the front of all windows within the graphic display 100, requests to bring the actual new window 150 in front of another window within the graphic display 100, requests to place the actual new window 150 behind one or more other windows of the graphic display 100, and requests to translate a point within the actual new window 150 to a point within the graphic display 100. For example, the client application 116 creates a request to translate a coordinate point within the actual new window 150 to a coordinate point for the graphic display 100. In this example, the client application 116 may pass the actual new window 150 coordinates of the point to the communication layer which in turn passes the coordinates to the host application. The host application then returns the graphic display 100 coordinates of the point.

Figure 2:
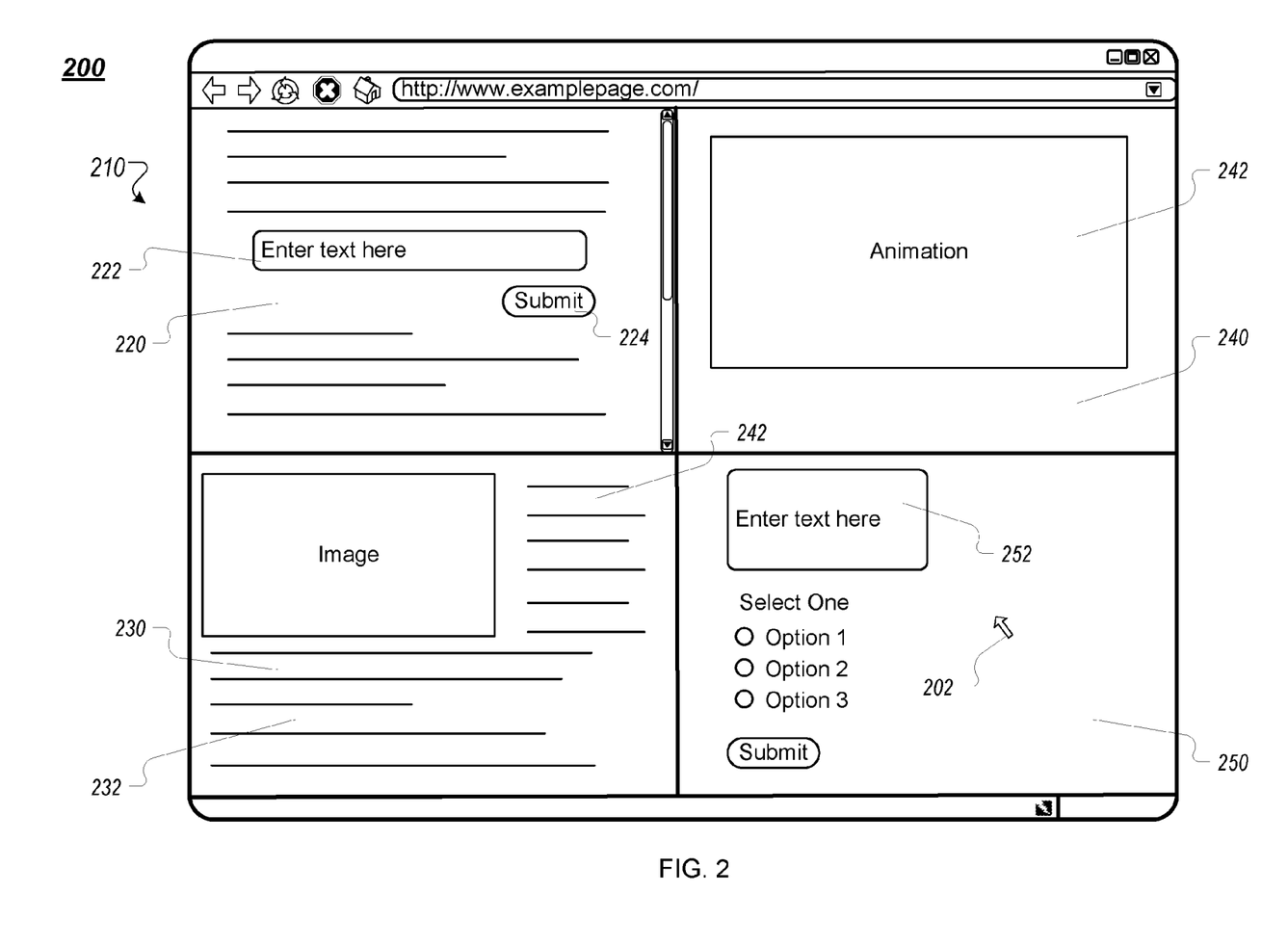
FIG. 2 shows an example application window having multiple display panels.

Referring now to FIG. 2, in accordance with some implementations, a graphic display 200 includes a window 210 having four window portions 220, 230, 240, and 250. The window 210 is an application window associated with a host application. For example, the window 210 can be a browser window of a web browser application. Each of the window portions 220, 230, 240, and 250 presents content. The content displayed within each window portions 220, 230, 240, and 250 includes a client application. In some implementations, each client application is executed by a virtual machine. In some implementations, the client applications present animation, video, or audio within the window portions 220, 230, 240, and 250. In some implementations, one client application may present content in more than one of the window portions 220, 230, 240, and 250. For example, a first client application may be executing within the window portion 220 and the window portion 240. From the perspective of the first client application, the two window portions 220 and 240 are two separate windows. The first client application therefore interacts with the window portions 220 and 240 as if they are separate and distinct windows. However, from the point of view of the host application, there is only one window 210 which includes both of the window portions 220 and 240. In some implementations, the window portion 240 may have been added to the window 210 in response to a request to create a new window sent by the first client application. In such implementations, a policy of the host application may specify that whenever a client application requests a new window, a new stand alone window is not created, but rather, a new window portion is created within the window where the requesting client application is executed. Other, different host applications may have different polices that specify that an individual, stand alone window is created in response to a request to create a new window sent by a client application.

In some implementations, the host application provides an event stream to the client applications. The event stream allows the client applications to receive input from a user in the form of keyboard key strokes, mouse clicks and movements, touch screen or touch pad input, or other input. For example, the window portion 240 includes animation 242. In this example, the client application running within the window portion 240 displays controls along with the animation 242 (e.g. pause, play, fast forward, volume adjustment, etc.). The event stream allows the client application to receive input from a user (e.g. mouse clicks and movements) in order to allow the user to use the controls displayed along with the animation 242. As another example, the window portion 220 displays a text field 222. The event stream allows a client application executing within the window portion 220 to receive key strokes from a user for populating the text field 222. The event stream further allows the client application executing within the window portion 220 to receive mouse clicks and movements input by a user in order to allow the user to select a submit button 224 to submit the text entered into the text field 222.

In some implementations, a user manipulates a cursor 202 to select areas within the window portions 220, 230, 240, and 250. In some implementations, the host application will control which window portion is the active window portion (sometimes referred to as controlling the focus of the window portions). For example, a policy of the host application may specify that whenever the cursor 202 is used to click within any part of a window portion, that window portion becomes the active window portion. In some implementations, the policy of the host application will allow client applications to control focus of the window portions. For example, a single client application is executing within each of the four window portions 220, 230, 240, and 250. In this example, the client application may have originally executed in only the window portion 220 and each of the additional window portions 230, 240, and 250 was created within the window 210 by the host application in response to requests to create new windows sent by the client application.

Continuing with this example, a user uses the cursor to select the text field 222. The client application then creates a request to transfer focus to the window portion 220, thereby making the window portion 220 the active window portion. In some implementations, the client application provides the request to transfer focus directly to the host application. In other implementations, the client application provides the request to transfer focus to a communication layer which in turn provides the request to transfer focus to the host application. If a policy of the host application allows the client application to specify focus, the host application approves the request to transfer focus, makes the window portion 220 the active window portion, and provides a response indicating that focus has been transferred to the window portion 220. Upon focus being transferred to the window portion 220, the client application is able to receive keystrokes from the user in order to populate the text field 222.

Still following this example, after populating the text field 222, the user selects a text display area 232 of the window portion 230. In this example, since the text display area 232 is not an area for receiving user input, the client application decides to keep focus on the window portion 220. Therefore, the client application does not create a request to transfer focus to the window portion 230. In this example, after the user clicks within the text display area 232, the client application will continue to use further keystrokes made by the user to populate the text field 222 since the window portion 220 has retained focus. Continuing with this example, the user then uses the cursor 202 to select a text field 252 displayed within the window portion 250. In this example, since the text field 252 is an area for receiving user input, the client application creates a request to transfer focus to the window portion 250. If a policy of the host application allows the client application to specify focus, the host application approves the request to transfer focus, makes the window portion 250 the active window portion, and provides a response indicating that focus has been transferred to the window portion 250. Upon focus being transferred to the window portion 250, the client application is able to receive keystrokes from the user in order to populate the text field 252.

Figure 3:
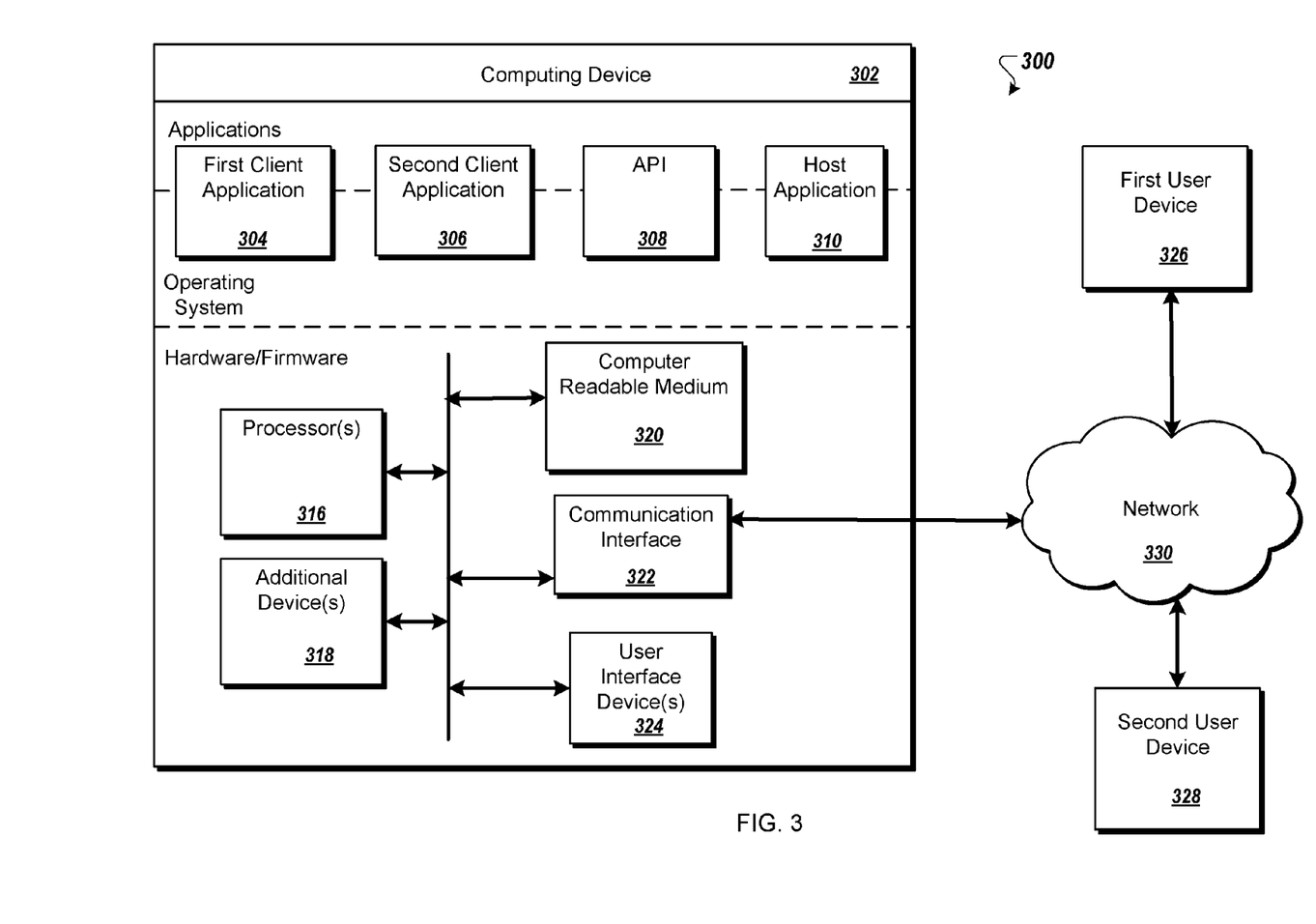
FIG. 3 shows an example architecture of a system.

Referring now to FIG. 3, a system 300 includes a computing device 302, The computing device 302 is a data processing apparatus, for example, a desktop computer, a mobile computing device, or a server. While only one data processing apparatus is shown in FIG. 3, a plurality of data processing apparatus may be used. In various implementations, the computing device 302 includes various applications, e.g. executable software programs. In various implementations, these applications include a first client application 304, a second client application 306, an API 308, and a host application 310.

The first and second client applications 304 and 306 are executed by virtual machines. In some implementations, the first and second client applications 304 and 306 execute by the same virtual machine. In other implementations, the first and second client applications 304 and 306 execute by different virtual machines. The outputs generated by the first and second client applications 304 and 306 are displayed within one or more windows provided by the host application 310. For example, the host application 310 is a web browser application, and the first and second client applications 304 and 306 are embedded applications that execute within browser windows.

The first and second client applications 304 and 306 generate window creation requests and window manipulation requests. For example, the second client application 306 creates a request to create a new window and includes a plurality of parameters associated with the requested window along with the request. As another example, the first client application 304 creates a request to change the appearance of a border of a window associated with the first client application 304. The first and second client applications 304 and 306 provide window creation requests and window manipulation requests to the host application 310 by passing the requests and associated parameters to the API 308. The API 308 then provides the requests, parameters specified by the first and second client applications 304 and 306, and optionally additional parameters to the host application 310.

In some implementations, the API 308 provides a class or data structure for facilitating window creation requests and window manipulation requests made by the first and second client applications 304 and 306. The class or data structure includes predefined attributes or variables. The first and second client applications 304 and 306 can set values for one or more of the variables associated with the class or data structure in order to make window creation requests and window manipulation requests and to specify parameters in association with the requests. For example, the first client application 304 uses the class or data structure to request a new window in which to present content. The first client application 304 specifies parameters associated with the requested new window by assigning values to one or more variables of the class or data structure. For example, the first client application 304 may set a border color variable to red to indicate that the first client application 304 is requesting that the new window have a red border.

In some implementations, before passing a window creation request or a window manipulation request to the host application 310, the API 308 will set values for one or more variables for which values were not set by the requesting client application. For example, the API 308 may assign a unique identifier to each client application. The API 308 can set a requesting client application variable to the unique identifier for the requesting client application before providing the request and associated parameters to the host application 310.

The host application 310 approves or denies window creation requests and window manipulation requests based on one or more policies as described above. In some implementations, the host application 310 will approve, deny, or modify specific parameters associated with a window creation request or a window manipulation request. For example, the second client application 306 sends a request to resize a window. The request includes height and width parameters specified by the second client application 306. If the height and width parameters specified by the second client application 306 are greater than maximum height and width dimensions specified by a policy of the host application 310, and the current size of the window is less than the maximum height and width dimensions specified by a policy of the host application 310, the host application 310 can resize the window to the maximum height and width dimensions allowed based on the policy.

Upon approving or denying a window creation request or a window manipulation request, the host application 310 provides an indication of the approval or denial to the API 308 which in turn provides the indication to the requesting client application. In some implementations, host application 310 will include additional parameters along with an indication of a request approval. For example, the host application 310 may include window dimension parameters along with an indication that a new window has been created in response to a window creation request. As another example, the host application 310 provides a window identifier or a window handle for a newly created window along with an indication that the window has been created.

The computing device 302 also has hardware or firmware devices including one or more processors 316, one or more additional devices 318, computer readable medium 320, and one or more user interface devices 324. User interface devices 324 include, for example, a display, a speaker, a keyboard, and a mouse or touch screen. The one or more processors 316 can be used to execute program code and perform the functionality of the above described executable software programs. The computer readable medium 320 can store executable software programs.

In some implementations, the computer readable medium is used to store program code and programming objects created by the executable software programs.

In some implementations, the communication interface 322 is used to communicate with one or more user devices, such as first and second user devices 326 and 328, through a network 330 (e.g. the internet). For example, the first and second user devices 326 and 328 can be desktop computers and the computing device 302 is a server. The first user device 326 can receive visual display output and audio output generated by the computing device 302. In some instances, the visual display output and audio output includes images, text, video, animation, or audio created by the first and second client applications 304 and 306.

Figure 4:
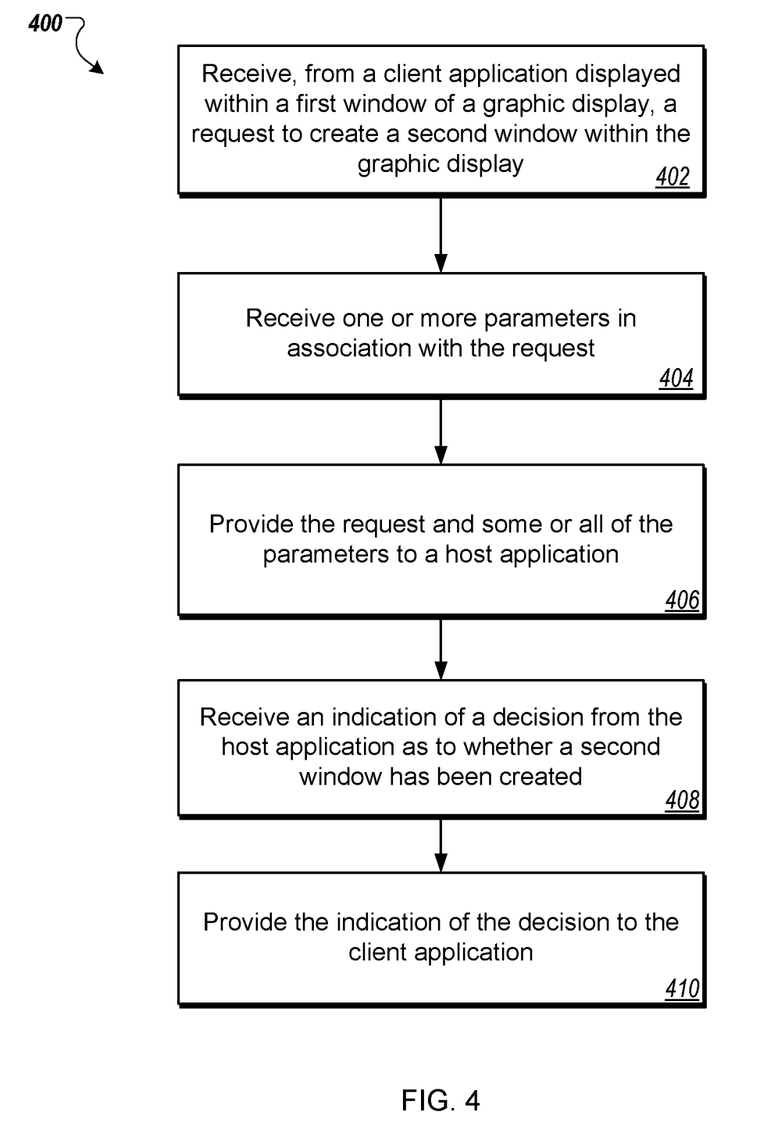
FIG. 4 shows a flowchart of an example technique for requesting a new window from a host application.

Referring now to FIG. 4, a method 400 for receiving a request for a new window from a client application and providing the request to a host application includes a step 402 of receiving, from a client application displayed within a first window of a graphic display, a request to create a second window within the graphic display. In some implementations, the application is running in a virtual machine. For example, the client application may be executed by a virtual machine within a browser window of a web browser host application. The client application creates a request for a new window in which to display additional content. The client application provides the request to a communication layer as described above.

At step 404, one or more parameters are received in association with the request. For example, when requesting a new window, the client application indicates desired parameters for the new window such as size dimensions, border color/theme, control buttons, etc. In some implementations, the client application specifies parameters by setting values for variables or attributes associated with a class or data structure. For example, referring to FIG. 1, the client application 116 generates a request for the host application to create the requested new window 130. Along with the request, the client application 116 sets minimizable and maximizable variables of a class associated with the request to "Yes." This indicates that the client application 116 is requesting that the requested new window 130 be minimizable and maximizable.

At step 406, the request and some or all of the parameters are provided to a host application. For example, referring to FIG. 3, the API 308 provides a request to create a second window and parameters associated with the request to the host application 310. In this example, the request and some or all of the parameters were previously received from the first client application 304 or the second client application 306. In some implementations, not all of the parameters received from the client application are provided to the host application. For example, a communication layer which receives and provides the requests may be aware that the host application does not allow windows to be resizable. Therefore, the communication layer will not provide a parameter indicating that the second window should be resizable to the host application. In some implementations, the communication layer provides additional parameters not received from the client application to the host application.

At step 408, an indication of a decision as to whether a second window has been created is received from the host application. In some implementations, the indication is received from the host application as a variable associated with a class or data structure. For example, the host application can set a window created variable to "No" or "Yes." In some implementations, the decision is based on one or more policies of the host application. For example, the host application denies a request to create a second window because a policy associated with the host application dictates that new windows are never to be created for client applications. As another example, the host application creates the new window in response to the request to create a second window because the policy specifies that new windows can be created for approved client applications and the requesting client application is on a list of approved client applications. In some implementations, the policy of the host application determines how the second window is displayed in relation to the first window. For example, the policy may dictate where the second window is located on a visual display that also includes the first window. As another example, the second window is created not as a stand alone window, but as a second window portion within the first window. In such instances, the content previously displayed by the first window remains in a first window portion of the first window. In such cases, the client application interacts with the two window portions as two separate windows.

At step 410 the indication of the decision is provided to the client application. In some implementations, additional parameters associated with the indication are provided to the client application. For example, if the indication indicates that a second window has been created, the indication further includes an identifier associated with the second window. As another example, parameters specifying the dimensions of the second window, or a color or theme of the border of the second window are provided along with an indication that the second window has been created.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method comprising:
   receiving a request and one or more parameters associated the request, the request originating from a client application corresponding to a display within a first window of a graphic display, the request and the one or more parameters involving creation of a second window;
   determining, based on a policy of a host application, whether to use the or more parameters to create the second window, the policy of the host application specifying rules as to which parameters are allowed to create the second window; and
   providing an indication of the determination to the client application, the indication including a result of the determination regarding use of the one or more parameters to create the second window.

2. The method of claim 1 wherein the second window is created as a second window portion within the first window.

3. The method of claim 1 wherein the second window is created as a standalone window separate from the first window.

4. The method of claim 1 wherein the one or more parameters includes height and width parameters for the second window.

5. The method of claim 1 wherein the one or more parameters includes parameters associated with a visual aspect of a border of the second window.

6. The method of claim 1 wherein the one or more parameters includes a location parameter for the second window.

7. The method of claim 1 wherein the one or more parameters includes the identifier associated with the second window.

8. The method of claim 1 wherein, if the indication of the determination indicates that a second window has been created, the indication further includes at least one parameter associated with the second window in addition to the identifier.

9. The method of claim 8 wherein:
   the one or more parameters includes height and width parameters for the second window; and
   the at least one parameter includes height and width parameters for the second window that are different than the height and width parameters included in the one or more parameters.

10. The method of claim 8 wherein:
    the one or more parameters is received as a first value of a variable associated with a class; and
    the at least one parameter is received as a second value of the variable associated with the class;
    wherein the second value is different from the first value.

11. The method of claim 1 wherein the one or more parameters are received as attributes associated with a class.

12. The method of claim 1 further comprising:
    receiving, from the client application, a request to change an aspect of the second window, where the request includes additional parameters;
    forming an indication as a result of a second determination from the host application as to whether the aspect of the second window has been changed, where the second determination is based on the policy of the host application; and
    providing the indication of the second determination to the client application.

13. A system comprising:
    one or more processors; and
    a computer-readable medium including instructions that when executed generate:
        a client application running in a virtual machine and displayed within a first window of a first graphic display, the client application configured to generate a request to create a second window within the first graphic display or a second graphic display and a set of requested parameters for the second window;
        a communication layer configured to provide an application programming interface (API) to facilitate the request; and
        a host application configured to receive the request and grant or deny use of one or more of the set of requested parameters in creating the second window responsive to the request based on a policy of the host application.

14. The system of claim 13 wherein the API includes a set of variables and the requested parameters are indicated by values assigned to the variables.

15. The system of claim 14 wherein:
    the client application is further configured to indicate a first parameters by assigning a first value to a first Variable;

and the host application is further configured to indicate a second parameter by assigning a second value to the first variable;

wherein the second value is different from the first value.

16. The system of claim 13 wherein at least one of the granted parameters is different from any of the requested parameters.

17. A computer program product tangibly embodied in a computer-readable medium and comprising instructions that when executed by a processor perform operations comprising:

provide a request to create a new window within a graphic display and a first set of one or more parameters associated with the request to a host application; and receiving an indication of a determination from the host application as to whether the new window has been created as having the one or more parameters, where the determination is based on a policy of the host application specifying rules as to which parameters are allowed to create the new window, the indication including a second set of one or more parameters that were used in the creation of the new window by the host application.

18. The computer program product of claim 17 in which the new window is created as a new window portion in a previously displayed window.

19. The computer program product of claim 17 in which the first set of one or more parameters includes height and width parameters for the new window.

20. The computer program product of claim 17 wherein the one or more parameters in the first set of one or more parameters are provided as attributes associated with a class.

* * * * *

UNITED STATES PATENT AND TRADEMARK OFFICE
CERTIFICATE OF CORRECTION

PATENT NO.        : 8,812,975 B2                                    Page 1 of 1
APPLICATION NO.   : 12/570627
DATED             : August 19, 2014
INVENTOR(S)       : Sandman, Jr. et al.

It is certified that error appears in the above-identified patent and that said Letters Patent is hereby corrected as shown below:

In the Claims

Column 17, Line 55, after "whether to use the", insert -- one --, therefor.

Column 18, Line 67, after "value to a first", delete "Variable", insert -- variable --, therefor.

Signed and Sealed this
Third Day of February, 2015

Michelle K. Lee
*Deputy Director of the United States Patent and Trademark Office*